United States Patent [19]

Shutic et al.

[11] Patent Number: 5,095,811
[45] Date of Patent: Mar. 17, 1992

[54] AUTOMOTIVE POWDER COATING BOOTH WITH MODULATED AIR FLOW

[75] Inventors: Jeffrey R. Shutic, Wakeman; Robert J. Holland, Avon, both of Ohio

[73] Assignee: Nordson Corporation, Westlake, Ohio

[21] Appl. No.: 594,105

[22] Filed: Oct. 9, 1990

[51] Int. Cl.$^5$ .............................................. B05B 15/12
[52] U.S. Cl. ..................................... 454/52; 118/326; 454/53; 454/238
[58] Field of Search ................. 98/115.2; 118/326, 634

[56] References Cited

U.S. PATENT DOCUMENTS

| | | | |
|---|---|---|---|
| 4,729,295 | 3/1988 | Osawa et al. | 98/115.2 |
| 4,730,553 | 3/1988 | Osawa et al. | 98/115.2 |
| 4,840,116 | 6/1989 | Murakami et al. | 98/115.2 |
| 4,951,600 | 8/1990 | Soshi et al. | 118/696 |
| 4,957,618 | 9/1990 | Andren | 209/303 |

FOREIGN PATENT DOCUMENTS

| | | | |
|---|---|---|---|
| 26359 | 4/1981 | European Pat. Off. | 118/326 |
| 2932392 | 2/1981 | Fed. Rep. of Germany | 118/326 |
| 2177946 | 2/1987 | United Kingdom | 118/326 |

*Primary Examiner*—Harold Joyce
*Attorney, Agent, or Firm*—Wood, Herron & Evans

[57] ABSTRACT

A method and apparatus of powder coating relatively large objects such as automotive or other vehicle bodies comprises a spray booth having an interior which includes a cut-in coating zone having a relatively large area to permit the application of powder onto the interior portions of the vehicle body such as the inner door flanges, a side coating zone area wherein the vertically oriented, exterior surfaces of the vehicle body are coated such as the doors and fenders, an overhead coating zone in which the horizontally oriented, exterior surfaces of the vehicle body are coated such as the hood, roof and trunk, and, two transition zones separating the three coating zones. Air infeed and exhaust devices associated with each coating zone and each transition zone are operated to vary the air flow rate within the booth interior in the course of movement of the vehicle body therethrough such that the air velocity in each coating zone is maintained below a predetermined maximum downdraft velocity throughout the coating operation, and such that a slightly negative pressure is maintained within the booth interior.

33 Claims, 2 Drawing Sheets

FIG.2

AUTOMOTIVE POWDER COATING BOOTH WITH MODULATED AIR FLOW

FIELD OF THE INVENTION

This invention relates to make-up type spray booths, and, more particularly, to a spray booth for applying powder coating material onto objects such as automotive or other vehicle bodies in which the velocity of the air flow through the powder spray booth is controlled in accordance with the position of the vehicle body therein to avoid exceeding a predetermined maximum velocity.

BACKGROUND OF THE INVENTION

Make-up type spray booths have been employed for a number of years in connection with the application of liquid spray coatings onto automotive and other vehicle bodies. Spray booths of this type include an elongated tunnel-like construction having an inlet for the ingress of the vehicle body, a coating application area, a paint curing or drying area in some designs and an outlet for the egress of the vehicle body. Conditioned air is introduced by an air feed blower into a plenum chamber at the top of the spray booth and is directed downwardly toward the vehicle body moving through the booth. This flow of conditioned air picks up oversprayed coating material, i.e., material which does not adhere to the vehicle body, and is then drawn downwardly through the sides and/or floor of the booth by one or more air exhaust fans. Filters are provided to remove painting mists, organic solvents and any other contaminants from the air, and the resulting filtered or clean air is withdrawn from the booth for expulsion to atmosphere or for recirculation to the conditioned air supply.

One problem associated with make-up spray booths of the type described above is to obtain a constant velocity air flow regardless of the variation in the available volume for air flow through the interior of the booth, while ensuring that contaminants do not enter or leave the booth interior. This type of constant velocity air flow within the spray booth is desirable to minimize disruption of the flow path between paint dispensing devices and the vehicle bodies so that a uniform coating is obtained on the vehicle bodies.

It has been suggested that one way of obtaining such constant velocity flow conditions within the spray booth is to operate an air infeed blower and an air exhaust fan at a relative speed so that the quantity of air entering the booth is equal to the quantity of air withdrawn from the booth. A problem with this design is that no provision is made for accommodating changing conditions within the booth interior caused by the number and position of vehicle bodies moving therethrough. That is, no accommodation is made for variations in the volume of air required to maintain constant downdraft velocity in the spray booth as the progression of a vehicle through the application area displaces actual make-up air volume requirements.

These limitations have been addressed to some extent in systems of the type disclosed in U.S. Pat. Nos. 4,261,256 to Joret and 4,653,387 to Osawa et al. These patents disclose air feed-type paint spray booths in which the air flow through the booth is varied in accordance with sensed conditions in the booth interior such as booth pressure and/or the air velocity at the inlet and outlet of the booth. For example, in the Joret U.S. Pat. No. 4,261,256, the speed of the air exhaust fan is dependent upon the pressure sensed within the interior of the booth in an effort to maintain a substantially constant air flow velocity through the booth and to avoid the discharge of contaminants within the booth from its inlet or outlet. The Osawa et al U.S. Pat. No. 4,653,387 includes an air infeed fan and an air exhaust fan whose speed of operation is varied in response to the air flow sensed at the inlet and/or outlet to the booth.

One problem with spray booths of the type disclosed in the Joret and Osawa et al patents is that measurements of pressure and/or velocity taken within the interior of the spray booth can be inaccurate, particularly when coating physically large objects such as vehicle bodies which displace substantial quantities of air in the course of movement through the booth. Velocity measurements taken at the inlet or outlet of the spray booth, for example, can differ as a vehicle body enters or exits the booth compared to intervals when no vehicle body is present at the booth inlet or outlet. In addition, the air velocity can be so low the booth interior that it is difficult to measure with commercially available equipment for painting environments. Because the speed of the air infeed blower and/or air exhaust fan is dependent upon such measurements of velocity or pressure within the booth interior in systems of the type described above, the velocity of the air moving through the booth might be adjusted incorrectly and/or outside of acceptable limits.

Variation in the air velocity within a spray booth is of particular concern when using powder coating material as opposed to the atomized liquid paint employed in the spray booths of the Joret and Osawa et al patents. Powder coating material is much lighter and less dense than atomized paint particles, and thus considerations of uniform air velocity within the interior of the spray booth become much more important in the application of powder coating material than that of liquid coating.

Other negative pressure, make-up type spray booths include longitudinally spaced paint spraying areas separated by "buffer" zones such as disclosed, for example, in U.S. Pat. No. 4,241,646 to Tsuruta et al. In designs of this type, the spray booth is divided into two or more paint spraying areas each having a separate plenum chamber for the introduction of conditioned air therein. No paint is applied to the vehicle body in the buffer or dead zones between the spraying zones. As the vehicle bodies move through each spraying zone, a draft or wake is created at the trailing end thereof which tends to draw the airborne, atomized paint particles along with the vehicle. The buffer or dead zones are provided to avoid the transmission of atomized paint particles from one spraying zone downstream to the next spraying zone. In systems of the type disclosed in the Tsuruta et al U.S. Pat. No. 4,241,646, the buffer zones have either no forceable ventilation or, alternatively, are ducted to blow air in a direction toward one of the adjacent spraying areas.

One problem with positive pressure, make-up type spray booths of the type disclosed in the Tsuruta et al U.S. Pat. No. 4,241,646 is that collection of the oversprayed, atomized paint particles is dependent to a large extent on the relatively high density and weight of such paint particles. The draft or wake created by movement of the vehicle body through the booth is insufficient to draw many of the heavy, liquid paint particles with the vehicle, and therefore the buffer zones between adjacent spraying areas can be provided with or without ventilation blowers to collect those particles which do follow the vehicle. In the event particulate powder material, being lower in density and lighter in weight than liquid paint, could be employed in systems of the type described in U.S. Pat. No. 4,241,646, the draft or wake developed by movement of the vehicle body could pull relatively large quantities of the powder material overspray from one coating zone, through a buffer zone and into the downstream coating zone. This can disrupt the application of coating material applied by spraying devices within the downstream spraying area, resulting in an unacceptable finish on the vehicle body.

SUMMARY OF THE INVENTION

It is therefore among the objectives of this invention to provide a spray booth for applying powder coating material onto relatively large objects such as automotive or other vehicle bodies in which substantially constant velocity air flow conditions are maintained within the interior of the booth, in which the air velocity within at least one coating zone of the booth interior is maintained below a predetermined maximum velocity and in which the pattern of coating material applied to the object is not disrupted by movement of the object through the spray booth.

These objectives are accomplished in a method and apparatus for applying powder coating material onto large objects such as automotive or other vehicle bodies which comprises a spray booth having a ceiling, a floor, opposed side walls and opposed end walls formed with an inlet and outlet, respectively, which define an interior providing a controlled area within which to apply powder coating material onto vehicle bodies moving through the booth on a conveyor. Preferably, the interior of the booth is divided into separate coating zones in which powder coating material is applied to different areas of the vehicle body, and "knock-down" or transition zones at the entrance and exit to the booth and between the coating zones in which excess, oversprayed powder coating material is collected. One coating zone may be a "cut-in" zone located near the inlet of the booth where the interior areas of the vehicle doors, hood, trunk, roof or other hard to reach areas are coated with hand-held or robotically manipulated powder dispensers. A side coating zone is located downstream from the cut-in zone, with a transition zone interposed therebetween, within which automatically manipulated powder dispensers apply coating material onto the vertically oriented exterior areas of the vehicle body such as the doors and fenders. A second transition zone is located downstream from the side coating zone which leads to an overhead spraying zone having automatically manipulated powder dispensers for directing powder coating material onto the horizontally oriented exterior areas of the vehicle body such as the hood, roof and trunk. A dedicated air supply and exhaust system is provided for each coating zone, and for each or both transition zones. These air supply and exhaust systems each include an air feed blower which directs conditioned air through an air feed duct into a plenum located at the top of the booth over a respective coating or transition zone, and an exhaust fan which withdraws filtered air through an exhaust duct communicating with the respective coating or transition zone at the bottom of the booth.

One aspect of the method and apparatus of this invention is predicated upon the concept of separately modulating the flow rate of the air introduced into each zone of the booth through their respective infeed ducts and air plenums, and the flow rate of the air withdrawn from the booth through the exhaust ducts associated with each zone, such that the downdraft velocity of the air within the interior of the booth does not disrupt the application of coating material onto the vehicle body and does not exceed a maximum, predetermined amount within the coating zones. Control of the downdraft velocity within each zone is achieved by adjusting the speed settings of the air feed blowers and/or air exhaust fans associated with each zone to obtain predetermined flow rates within their respective infeed ducts and exhaust ducts. In order to ensure that the predetermined flow rates are maintained, sensors are located at points exteriorly of the booth, i.e., within the associated infeed duct and exhaust duct, which sense the actual flow rates therethrough and provide corresponding signals to a controller which then adjusts the speed of operation of the air feed blower and/or air exhaust fan associated with each zone in accordance with the volume of air displaced by a vehicle body as it moves through the booth.

In the presently preferred embodiment, a calibration procedure is employed to obtain the above-mentioned "predetermined" infeed and exhaust air flow rates within each zone which are required to maintain constant downdraft velocity within each coating zone as the vehicle moves therethrough. Initially, the flow rate of make-up air into each zone with no vehicle bodies present within the booth is set at substantially the same level, and is adjusted to create a slightly negative pressure within the booth as described below. An air flow "profile" is then obtained for each coating zone and each transition zone, which comprises a series of air velocity measurements within each zone as the vehicle moves therethrough. For example, when the vehicle enters a given zone and begins to occupy more area therein, i.e., displaces a greater volume of air, the air velocity within that zone increases if the air flow rate remains the same because less cross-sectional area is available to for the air to move through such zone due to the presence of the vehicle. In order to obtain a constant downdraft velocity, the air flow rate through such zone must therefore be decreased. The purpose of the calibration procedure is to obtain a "profile" of how the air velocity changes as the vehicle moves through a given zone, so that the speed settings of the air feed blowers and/or air exhaust fans for each zone can be increased or decreased dependent on the vehicle position therein to obtain a constant downdraft velocity. The calibrated air flow profiles for each zone, i.e., the respective blower and fan speed settings necessary to obtain constant downdraft velocity, are recorded in the controller which is then operative to automatically modulate the air flow within each zone during a production run as the vehicle moves through the booth to ensure constant downdraft velocity is maintained.

In another aspect of this invention, it has been found to be desirable to create a slightly negative pressure within the interior of the powder spray booth at all times during its operation. This is accomplished by sensing the velocity of the air entering and leaving the spray booth at locations exteriorly of the booth, e.g., by air velocity sensors located in the air feed ducts connecting each air feed blower to the plenums associated with each zone of the booth, and by air velocity sensors located in the exhaust ducts which connect each of the zones of the booth with an air exhaust fan. Measurements taken within the air feed and exhaust ducts are more accurate than measurements made within the interior of the booth because the air is moving at a constant high velocity, and, therefore, is more accurately measured by commercially available air flow measurement devices.

Given the cross sectional area of each duct, the air flow rate through both the air feed ducts and exhaust ducts can be calculated in the controller by sensing the air velocity within the ducts with a multi-point sensing device which produces an average air velocity there within and then multiplying such velocity by the duct area. In response to the calculated flow rate of the air within each duct, the controller is effective to control the relative speed of operation of the air feed blower and air exhaust fan associated with each zone such that slightly less air flow enters the interior of the booth than is withdrawn therefrom. A slightly negative pressure is thus maintained within the entire interior of the booth to ensure that no powder material from inside of the booth exits its inlet or outlet.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
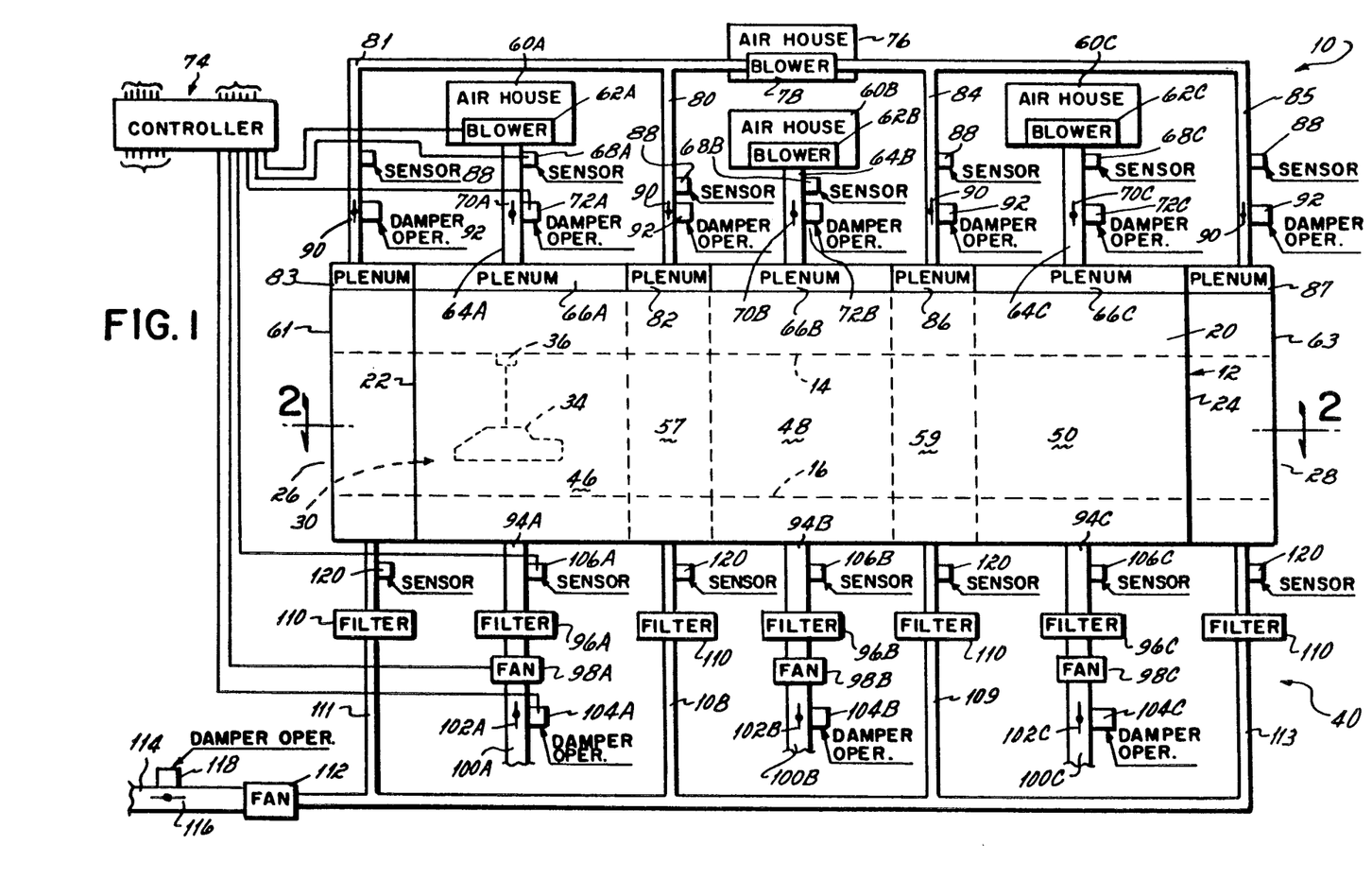
FIG. 1 is a schematic view of the automotive powder coating spray booth of this invention.
Figure 2:
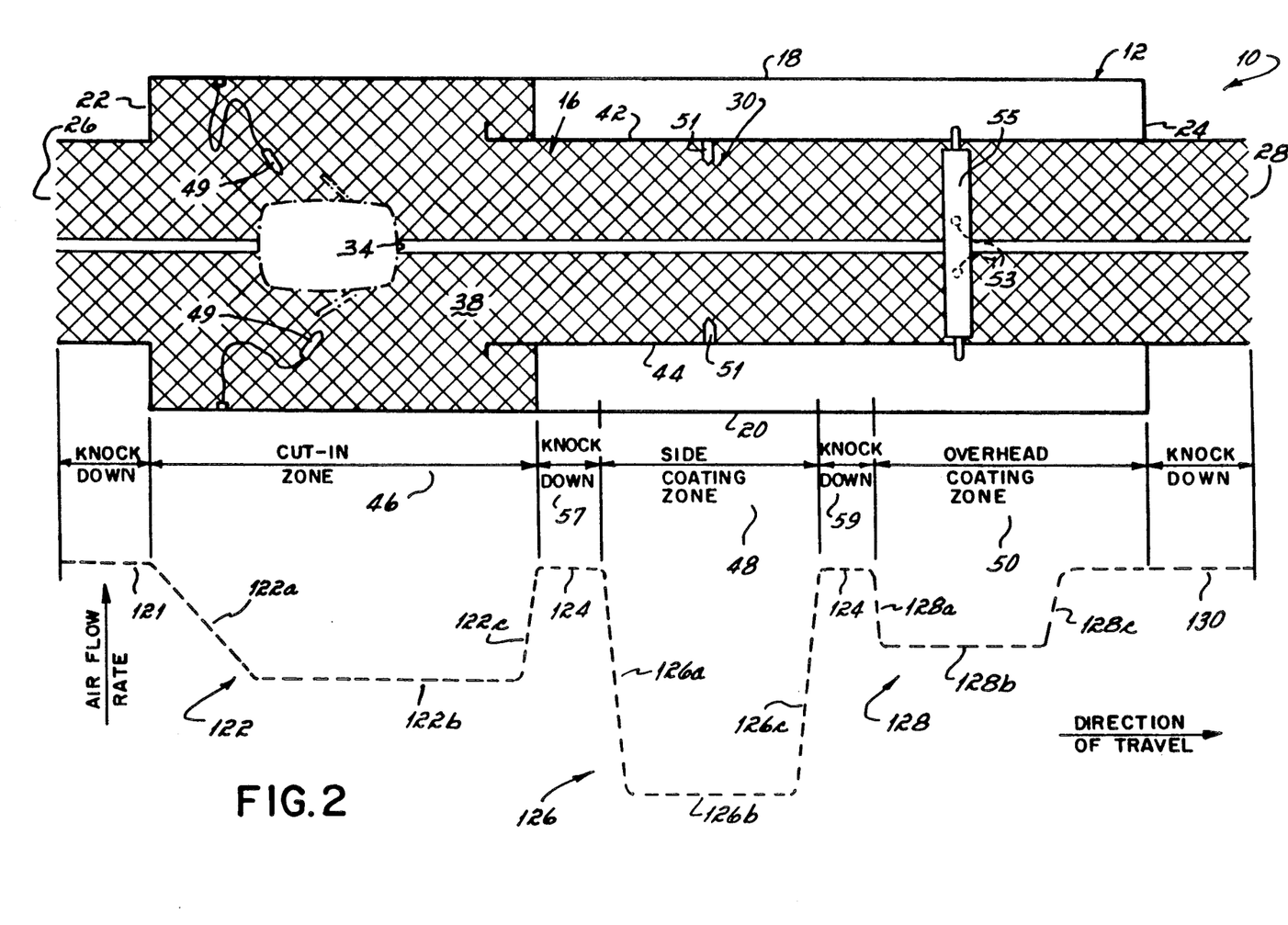
FIG. 2 is a cross sectional view taken generally along line 2—2 of FIG. 1 illustrating the configuration of the interior of the spray booth and providing a profile of the flow rate at which air is fed into the booth and withdrawn from the booth as a function of the position of the vehicle body therein.

Referring now to the Figs., the powder coating system 10 of this invention includes a spray booth 12 having a ceiling 14, a floor 16, opposed outer side walls 18, 20 and end walls 22, 24 formed with a booth inlet 26 and booth outlet 28, respectively. This construction of spray booth 12 forms an interior 30 defining a substantially controlled area in which to apply powder coating material onto objects such as a vehicle body 34 moved by a conveyor 36 through the spray booth 12. Oversprayed powder material which does not adhere to the vehicle body 34 passes through gratings 38 located along the floor 16 of the spray booth 12 and into a powder collection and recovery system 40, the function of which is described in more detail below.

In the presently preferred embodiment, the interior 30 of powder spray booth 12 also includes a pair of inner side walls 42 and 44, spaced inwardly from the outer side walls 18, 20, respectively, which extend longitudinally from the end wall 24 toward the end wall 22 formed with the booth inlet 26. As depicted in FIG. 2, a space is formed between the end wall 22 and the leading edge of inner side walls 42, 44 which forms a cut-in zone 46 within the booth interior 30 whose cross sectional area is defined by the ceiling 14, floor 16 and the outer side walls 18, 20. Downstream from this cut-in zone 46, in between the inner side walls 42, 44, are a side coating zone 48 and an overhead coating zone 50, both of which are defined by the ceiling 14, floor 16 and the inner side walls 42, 44. The side and overhead coating zones 48, 50 thus have a smaller cross sectional area than that of cut-in zone 46.

A spray coating operation performed in accordance with the method of this invention preferably includes a three-stage powder coating sequence. Initially, the vehicle body 34 is transported by the conveyor 36 through the booth inlet 26 into the cut-in zone 46 which has sufficient cross sectional area to permit opening of its doors as schematically depicted in FIG. 2. In this cut-in zone 46, hand-held or robotically manipulated powder dispensers such as spray guns 49 apply powder coating material onto the inside surfaces of the vehicle doors, hood, engine bay, trunk and other hard to reach areas. Once this spraying operation is completed, the vehicle body 34 is advanced into the side coating zone 48 where powder dispensers 51 are manipulated by automatically operated dispenser moving devices (not shown) to apply powder coating material onto the vertically oriented surfaces of the vehicle body 34 such as the outside of the doors, the fenders and any other vertical surfaces. The vehicle body 34 is then advanced from the side coating zone 48 into the overhead coating zone 50 where powder dispensers 53 located on an overhead carrier 55 above the path of the vehicle body 34 apply powder coating material onto the horizontal surfaces of the vehicle body 34, such as the hood, roof and trunk.

In order to collect oversprayed powder which does not adhere to the vehicle body 34 within any of the cut-in, side coating and/or overhead coating zones 46, 48, and 50, "make-up" air must be introduced into the booth interior 30 to pick up or entrain the powder material for delivery to the powder collection and recovery system 40. Powder collection is achieved within each of the coating zones 46, 48 and 50, and within the "knock-down" or transition zones 57 and 59. The first transition zone 57 is located between the cut-in zone 46 and side coating zone 48, whereas the second transition zone 59 is located between the side coating zone 48 and the overhead coating zone 50. The purpose of the transition zones 57 and 59 is to collect oversprayed powder which is drawn by the slight draft or wake created by the movement of the vehicle body 34 through the booth interior 30. This draft or wake can draw the powder coating material overspray from the cut-in zone 46 into the side coating zone 48, and/or from the side coating zone 48 into the overhead coating zone 50, which, unless collected within the transition zones 57, 59, could adversely effect the spraying conditions in the booth 12.

In some instances it has been found to be desirous to provide a "knock-down" or transition zone 61 at the booth inlet 26 and another transition zone 63 at the booth outlet 28. The transition zone 63 at the booth outlet 28 helps prevent the draft or wake of the vehicle 34 from pulling powder coating material overspray out of the booth which could contaminate vehicle processing areas downstream from the booth or the plant in general. The transition zone 61 located at the inlet 26 helps prevent the introduction of thermal currents or layers to the coating zones. It has been found that if the difference between the temperature of the conditioned air of the spray booth 10 and the ambient temperature of the factory air at the booth inlet 26 is large enough, thermal currents can be introduced into the cut-in zone 46 which disrupt some of the air flow pattern, which, in turn, affects the transfer efficiency of the powder coating material.

In the presently preferred embodiment, each of the coating zones 46, 48 and 50 is provided with a dedicated system for introducing make-up air therein, and for withdrawing filtered air from the bottom of the booth 12 into the powder recovery system 40. Similarly, the transition zones 57 and 59 are provided with one of two alternative systems for introducing make-up air therein and for withdrawing filtered air from the booth interior 30, as described below. For purposes of the present discussion, the make-up air delivery and exhaust system associated with the cut-in zone 46 is described in detail herein, it being understood that the identical structure may be provided for both the side coating zone 48 and overhead coating zone 50. For purposes of identification in the Figs., the reference numerals used to describe the structure associated with the cut-in zone 46 include the letter "A", while the identical structure associated with the side coating zone 48 and overhead coating zone 50 include the letters "B" and "C", respectively.

Referring now to FIG. 1, make-up air is supplied into the cut-in zone 46 by an air house 60A containing a variable speed air feed blower 62A which is connected by a feed duct 64A to an air plenum 66A mounted at the top or ceiling 14 of the spray booth 12 along the length of the cut-in zone 46. The plenums 66B and 66C extend along the length of the side coating zone 48 and overhead coating zone 50, respectively. The air house 60A introduces make-up or "conditioned" air, i.e., filtered and tempered air, through the feed duct 64A into the plenum 66A which distributes the conditioned air along the length of the cut-in zone 46. Preferably, the feed duct 64A is provided with an air velocity sensor 68A, an adjustable damper 70A and a damper operator 72A which opens and closes the damper 70A. The air velocity sensor 68A and damper operator 72A of feed duct 64A are connected to a controller 74 for purposes described in detail below.

Make-up air is also introduced into the knock-down transition zones 57, 59, 61 and 63 by an air supply system which comprises an air house 76 containing a variable speed air feed blower 78. The blower is connected by a feed duct 80 to the plenum 82 of transition zone 57, by a feed duct 84 to the plenum 86 of the transition zone 59, by feed duct 81 to the plenum 83 of transition zone 61 and by feed duct 85 to the plenum 87 of transition zone 63. These plenums 82, 86, 83 and 87 effectively distribute the make-up air along the length of the transition zones 57, 59, 61 and 63, respectively. Preferably, the feed duct 80 is provided with an air velocity sensor 88, an adjustable damper 90 and a damper operator 92 which opens and closes the damper 90. The feed duct 84 is provided with an air velocity sensor 88, an adjustable damper 90 and a damper operator 92 which are identical in structure and function to those associated with feed duct 80. Each of the transition zones 61 and 63 at the ends of the booth 10 are similarly equipped with an air velocity sensor 88, and adjustable damper 90 and a damper operator 92 in their feed ducts 81 and 85, respectively. The air velocity sensor 88 and damper operator 92 within each feed duct 80, 84, 81 and 85 are connected to the controller 74 for purposes described below.

The exhaust portion of the dedicated air supply and exhaust system for each zone of the booth interior 30 is illustrated at the bottom of FIG. 1. In the presently preferred embodiment, the powder collection and recovery system 40 at the base of the spray booth 12 in the area beneath the cut-in zone 46 is connected by an exhaust duct 94A through a final filter 96A to the intake side of a variable speed air exhaust fan 98A, which is connected to the controller 74. The discharge side of the exhaust fan 98A, in turn, is connected to a discharge duct 100A, which contains a damper 102A. The damper 102A may be identical to the damper 70A in air feed duct 64A, and is adjustable between open and closed positions by operation of a damper operator 104A connected to the controller 74. The exhaust duct 94A also contains an air velocity sensor 106A operatively connected to the controller 74. As mentioned above, the side coating zone 48 and overhead coating zone 50 each have the identical exhaust elements as cut-in zone 48, except that such exhaust elements are connected to the powder collection and recovery system 40 in the area of the respective side and overhead coating zones 48, 50 as shown in FIG. 1. For purposes of identification, the exhaust elements associated with the side coating zone 48 which are identical to those in cut-in zone 46 are given the same reference numbers except with the addition of the letter "B", while those in the overhead coating zone 50 are identified with the addition of a letter "C".

In order to provide laminar air flow about the vehicle, it is believed to be important to draw the air from the floor of the spray booth and for the cross sectional area of the plenum associated with each of the coating and transition zones to be approximately equal to the cross sectional area of the floor 16 of the booth beneath. This will tend to eliminate lateral (horizontal) cross drafts, producing air flow within a coating zone which is substantially a downdraft flow. A laminar air flow will increase the transfer efficiency of the powder to the vehicle.

In one presently preferred embodiment, the transition zones 57, 59, 61 and 63 also include a dedicated air exhaust system. Specifically, the area of powder collection and recovery system 40 beneath each transition zone 57, 59, 61 and 63 is connected by exhaust ducts 108, 109, 111 and 113, respectively, through final filters 110 to the intake side of a variable speed air exhaust fan 112. The discharge side of the exhaust fan 112, in turn, is connected to a discharge duct 114 which contains a damper 116 operated by a damper operator 118. In response to a signal from the controller 74, as described below, the damper operator 118 is effective to adjust the position of damper 116 between an open and closed position as required. Preferably, each exhaust duct 108, 109, 111 and 113 also includes an air velocity sensor 120 which is also connected to the controller 74.

The powder collection and recovery system 40 functions to receive air and air-entrained, oversprayed powder material from each zone within the booth interior 30, filter the oversprayed powder to form clean air and then discharge the clean air through the exhaust ducts 94A-C, and 108, to atmosphere or back to the air houses 60A-C and 76. The collected, oversprayed powder is transmitted from the system 40 to a hopper or other container (not shown) for storage or reuse. The details of the powder collection and recovery system 40 are set forth in commonly assigned U.S. patent application Ser. No. 07/510,295, filed Apr. 16, 1990, entitled "Powder Coating System", the disclosure of which is hereby incorporated by reference in its entirety.

As discussed above and shown in FIG. 1, the blower 62A, air velocity sensor 68A and damper operator 72A which supply conditioned air into the cut-in zone 46 are each connected to the controller 74. Similarly, the velocity sensor 106A, fan 98A and damper operator 104A which withdraw air from the powder collection and recovery system 40 in the area of cut-in zone 46 are also connected to the controller 74. These same air supply and exhaust elements associated with the side coating zone 48, overhead coating zone 50 and transition zones 57, 59 are also connected to the controller 74 as depicted schematically by the three groups of bracketed leads shown in FIG. 1. As described below, the controller 74 is effective to control the operation of the entire system 10 in accordance with the position of one or more vehicle bodies 34 in the booth interior 30.

The primary objective of the above-described air flow system of spray booth 12 is to control the air velocity within the booth interior 30. The powder coating material discharged from the dispensers 49, 51 and 53 within the booth interior 30 is relatively lightweight, having a specific gravity, for example, in the range from about 0.9 to 1.4, compared, for example, to atomized liquid paint particles, and must be applied with particular attention to the air velocity within the interior 30 of spray booth 12. It has been found that spray conditions for powder coating material vary with the type of application, i.e., side coating, top coating, cut-in, and are most favorable when the air velocity within a coating zone does not exceed a predetermined value. A method has been developed in accordance with this invention to ensure that air velocity within a coating zone is maintained substantially constant regardless of the position of a vehicle body 34 in the respective coating zone.

In accordance with a method of this invention, a calibration procedure is utilized to obtain air velocity measurements in each coating zone 46, 48 and 50 within the booth interior 30 based on the position therein of a vehicle body 34 of given type and dimension. Initially, all of the air feed blowers 62A-C and 78, and the air exhaust fans 98A-C and 112, are operated at a constant speed when the system 10 is first activated and no vehicle bodies 34 are present within the booth interior 30. A calibration procedure is then undertaken in which a vehicle body 34 is first moved into the cut-in zone 46 and the speed of operation of the air feed blower 62A and/or exhaust fan 98A is adjusted to introduce air at an "air flow rate", i.e., an air flow volume per unit time (CFM), such that the downdraft air velocity through the cut-in zone 46 of the booth interior 30 is a constant predetermined value, such as, for example, about sixty feet per minute. This air flow rate is obtained by placing an air velocity measuring device or devices within the cut-in zone 46, and then varying the speed of operation of the blower 62A and/or exhaust fan 98A as the vehicle moves through the cut-in zone 46 to maintain a substantially constant downdraft velocity within the cut-in zone 46. Variation of the blower 62A and/or exhaust fan 98A speed is required because the vehicle body 34 displaces progressively more air within the cut-in zone 46 until it is entirely contained therein, and then progressively less air is displaced as the vehicle body 34 exits the cut-in zone 46. As more air is displaced by the vehicle body 34, e.g., when it moves into the cut-in zone 46, less air is available to circulate through the cut-in zone 46 and the speed of the blower 62A and/or exhaust fan 98A must be reduced to maintain constant downdraft velocity. On the other hand, as less air is displaced by the vehicle body 34, e.g., when it exits the cut-in zone 46, more air is present within the cut-in zone 46 and the speed of blower 62A and/or exhaust fan 98A must be increased to maintain constant downdraft velocity. A sufficient number of air velocity measurements are taken within the cut-in zone 46 as the vehicle body 34 moves therethrough to obtain appropriate speed settings for the blower 62A and/or exhaust fan 98A so that the air flow rate into the cut-in zone 46 is adjusted as a function of the position of the vehicle body 34 to produce a constant downdraft velocity throughout movement of the vehicle body 34 through the cut-in zone 46. These speed settings are recorded in the controller 74 for a particular vehicle type.

The calibration procedure is conducted in the side coating zone 48 and overhead coating zone 50 in the same manner described above. In each zone, sufficient measurements of downdraft velocity are taken to obtain the appropriate speed settings of the blower 62B and/or exhaust fan 98B in the side coating zone 48, and the blower 62C and/or exhaust fan 98C in the overhead coating zone 50, in order to maintain constant downdraft velocity as the vehicle body 34 moves through each zone 48, 50. Preferably, the air velocity calibration measurements in the side coating zone 48 are taken at a location between one of the inner side walls 42 or 44 and a vertically oriented section of the vehicle body 34, e.g., a door or fender, at about the midpoint of the height of such vertical section. The highest air velocity within side coating zone 48 is produced within this relatively narrow area between the side walls 42, 44 and vehicle body 34, and thus it is preferable to obtain the speed settings of blower 62B and/or exhaust fan 98B using calibration measurements from this area.

The air velocity calibration measurements for the overhead coating zone 50 are taken at one or more locations along the horizontally oriented surfaces of the vehicle body 34 such as the hood, roof and/or trunk. This ensures that the speed settings of the blower 62C and/or fan 98C associated with the overhead coating zone 48 are set to obtain an air flow rate within the overhead coating zone 50 which produces the desired, downdraft velocity along those horizontally oriented sections of the vehicle body 34 which are coated therein. The speed settings obtained for the blower 62B and fan 98B of the side coating zone 48, as well as those obtained for blower 62C and fan 98C of the overhead coating zone 50, are also stored in the controller 74 for a production run.

After the calibration procedure is completed, operation of this aspect of the air flow system of the spray booth 12 proceeds as follows. The vehicle body 34 enters into the spray booth 12 through the booth inlet 26 knock-down zone via the conveyor 36 to prevent the introduction of thermal air currents and to prevent the speed of the powder overspray material from leaving the cut-in zone 46. In order to accomplish this, the blower 78 of the air house 76 associated with the transition zones is operated at a relatively high flow rate as schematically depicted in FIG. 2. As the vehicle body enters the cut-in zone 46 from the transition zone 61, the controller 74 sends signals to the feed blower 62A and/or exhaust fan 98A to provide a flow of air to the cut-in zone 46 of the booth interior 30 from the feed duct 64A and plenum 66A at a flow rate profile 122 which was obtained as a result of the above-described calibration procedure. As depicted schematically in FIG. 2, the air flow rate decreases or "ramps down" at 122a as the vehicle body 34 enters cut-in zone 46, remains at a substantially constant level 122b when the entire vehicle body 34 is present therein, and then increases or "ramps up" at 122c back to the initial level as the vehicle body 34 leaves the cut-in zone 46. In the cut-in zone 46 of the booth interior 30, powder coating material is applied by hand-held or robotically manipulated powder dispensers 49 as described above.

The vehicle body 34 proceeds from the cut-in zone 46 toward the side coating zone 48, but in the course of movement to the side coating zone 48 the vehicle body 34 passes through the first transition zone 57. In order to prevent oversprayed powder material within the cut-in zone 46 from entering the side coating zone 48, the transition zone 57 is provided to collect such oversprayed powder as the vehicle body 34 passes therethrough. In order to accomplish this, the blower 78 of air house 76 associated with the transition zones 57, 59 is operated at a relatively high flow rate 124 as depicted in FIG. 2.

In the course of movement of the vehicle body 34 from the first transition zone 57 into the side coating zone 48, the controller 74 operates to vary the speed of operation of the blower 62B and/or exhaust fan 98B in accordance with the air velocity profile 126 obtained during the calibration procedure. Initially, as the vehicle body 34 enters the side coating zone 48, the air flow rate supplied by duct 64B to the side coating zone 48 and exhausted by duct 94B is decreased or ramped down as depicted at 126a to a lower level 126b illustrated at the center of FIG. 2. This lower air flow rate 126b supplied to and from the side coating zone 48 is necessary in order to maintain the air velocity therein below the predetermined maximum level with the entire vehicle body 34 present within zone 48, and may be less than the lowest air flow rate level 122b within the cut-in zone 46 because the vehicle body 34 displaces proportionately more volume within the smaller side coating zone 48 than in the larger cut-in zone 46. As the vehicle body 34 exits the side coating zone 48, the air flow rate as depicted at 126c increases or "ramps up" back to the initial level. The operation of controller 74 is sequenced with the speed at which the conveyor 36 advances the vehicle body 34 through the booth interior 30 such that the speed of blowers 62A, B and/or exhaust fans 98A, B is automatically adjusted in accordance with the position of the vehicle body 34 within the cut-in zone 46 and the side coating zone 48, respectively. This ensures that the air velocity at any location in either zone 46 or 48 does not exceed the predetermined maximum level.

After having received a coating of powder material on its vertically oriented areas, the vehicle body 34 then proceeds from the side coating area 48 through the second transition zone 59 to the overhead coating zone 50. The speed of operation of blower 62B and/or fan 98B associated with side coating zone 48 increases or "ramps up" the air flow rate within such zone 48 as the vehicle body 34 leaves and enters the knock-down or transition zone 57. This second transition zone 59 functions in the same manner as the first transition zone 57 and is effective to collect any oversprayed powder coating material which may be drawn by the vehicle body 34 from the side coating area 48 toward the overhead coating area 50. As depicted in FIG. 2, the air feed blower 78 of air house 76 associated with the transition zones 57, 59 is operated at a high level 124 compared to the blower 52A-C and/or exhaust fans 98A-C to ensure that essentially none of the oversprayed coating material is transmitted between coating zones.

When the vehicle body 34 enters the overhead coating zone 50, the speed of operation of blower 62C and/or exhaust fan 98C is governed by the air velocity profile 128 obtained during the calibration procedure. Initially, the air flow rate is decreased or ramped-down as depicted at 128a to obtain an an air flow rate 128b within the ducts 64C and 94C supplying and exhausting the overhead coating zone 50 which is appropriate when the entire vehicle body 34 is present therein. As the vehicle body 34 leaves the overhead coating zone 50 and proceeds to the transition zone 63 at the booth outlet 28, the speed of operation of the blower 62C and exhaust fan 98C is allowed to increase as depicted at 128c in preparation for another coating operation on the next vehicle body 34 (not shown).

As stated above, the booth outlet may include a knock-down or transition zone to help prevent the overspray material from escaping the booth and contaminating other parts of the plant. In order to accomplish this, the blower 78 of the air house 76 associated with the transition zones is operated at a relatively high flow rate 130.

In one example of the operation of booth 10, vehicle bodies 34 have been coated with powder material to produce a clear coat, top coat finish is conducted under the following conditions. The powder coating material is manufactured by PPG, and is commercially available under the designation ENVIRACRYL TM; however, it is believed that other powders would be applicable for use within a coating zone. Such powder coating material has a small particle size, i.e., average in the range of 10-12 microns, compared to standard powders. Utilizing such powder coating material, the downdraft velocity is maintained such as not to exceed 60 feet per minute within the side coating zone 48. The downdraft velocity of the cut-in zone 66 is maintained at not less than 100 feet per minute to satisfy the NFPA ventilation requirements for a manual operation. This downdraft velocity could change, however, in an automatic cut-in operation such as performed by robots. Preferably, the downdraft velocity of the overhead coating zone 50 is within the range of about 120 to 140 feet per minute.

It is contemplated that for many types of vehicle bodies 34, the downdraft velocity within the coating zones 46, 48 and 50 of the booth interior 30 can be sufficiently controlled by varying the speed of operation of the feed blowers 62A-C individually, or in combination with the speed of operation of exhaust fans 98A-C. In some applications, however, such as where the spray booth 12 is utilized to powder coat both very small and very large vehicle bodies 34, some additional flow adjustment may be required. That is, the range of the frequency of operation of the feed blowers 62A-C and/or exhaust fans 98A-C may not be sufficient to increase or decrease the air flow within one or more of the coating zones 46, 48 and/or 50 to the degree required to properly adjust the air velocity therein. In such instances, the controller 74 is effective to partially open or close the damper 70A-C in feed ducts 64A-C, respectively, and/or the damper 102A-C in the discharge ducts 100A-C, respectively, so as to obtain the required air flow into or out of one or more of the coating zones 46, 48 and/or 50. Alternatively, the dampers 70A-C and/or 102A-C can be manually adjusted to the desired position in lieu of automatic adjustment. In this manner, the appropriate air velocity can be obtained regardless of the size of the vehicle body 34.

It is further preferred to provide each feed duct 64A-C with a pressure sensor (not shown). This may be accomplished with an individual pressure sensor or with a sensor 68A-C which measures both the flow rate and the pressure. The sensor would only be required in the calibration procedure to assure that the blower motors 62A-C were operating within the appropriate fan curves.

In another aspect of this invention, a slightly negative pressure is maintained within the interior 30 of spray booth 12 for the purpose of preventing any powder from exiting the booth interior 30 through the booth inlet 26 or outlet 28. Maintenance of a slightly negative pressure within the booth interior 30 is achieved by ensuring that the flow rate of air directed into the spray booth 12 from the air houses 60A-C and 76 is always slightly less than the flow of filtered air withdrawn from the booth interior 30 through the exhaust ducts 94A-C and 108. In the presently preferred embodiment, the air velocity sensors 68A-C within the feed ducts 64A-C, respec-tively, and the air velocity sensors 88 within the feed ducts 80, 84, each sense the velocity of the air discharged from the blowers 62A-C and 78 within the associated air houses 60A-C and 76. The air velocity sensors 68A-C and 88 each may be a multi-point sensing device which measures the air velocity at a number of different points and averages them to produce a signal corresponding to the average air velocity. The signals are sent to the controller 74 which calculates the flow rate of the air from the respective air houses 60A-C and 76 by multiplying the sensed air velocity times the cross sectional area of the respective feed ducts 64A-C, 80 and 84. Similarly, the velocity sensors 106A-C and 120 in each exhaust duct 94A-C, 108 and 109, respectively, each sense the velocity of the air being withdrawn from the spray booth 12 and send corresponding signals to the controller 74 which calculates the air flow rate within the exhaust ducts 94A-C, 108 and 109 in the same manner as in the feed ducts.

The flow rate of the conditioned air entering the booth interior 30 through the feed ducts 64A-C, 80 and 84 is compared in the controller 74 with the flow rate of the filtered air withdrawn from the booth interior 30 through the exhaust ducts 94A-C, 108, 109 respectively. The controller 74 is effective to maintain a predetermined difference between the flow rate in the feed ducts 64A-C, 80 and 84, and exhaust ducts 94A-C, 108 and 109, by adjusting the speed of operation of the variable speed, feed blowers 62A-C and 78 in the air houses 60A-C and 76, respectively, and/or by adjusting the speed of operation of the variable speed exhaust fans 98A-C and 112 con- nected to the exhaust ducts 94A-C, 108 and 109, respectively. This ensures that a slightly negative pressure is maintained within the booth interior 30 throughout operation of the spray booth 12.

The controller 74 is therefore utilized in the system of this invention for two separate purposes. As mentioned above, one function of the controller 74 is to automatically "ramp down" and then "ramp up" the speed of blowers 62A-C and 78, and/or exhaust fans 98A-C and 112, in accordance with the position of the vehicle body 34 within spray booth 12. At the same time, the controller 74 functions to adjust the operational speed of the blowers 62A-C and 78, and/or exhaust fans 98A-C and 112, to ensure a slightly negative pressure is maintained within the booth interior 30. In the presently preferred embodiment, the controller 74 includes one closed loop which controls operational speed of the blowers 62A-C and 78, and/or exhaust fans 98A-C and 112, to perform the "ramp up-ramp down" function, and a second closed loop which maintains negative pressure within the booth interior 30. The "ramp up-ramp down" function involves a "macro" or relatively large magnitude of adjustment of the operational speed of the blowers 62A-C and 78, and/or exhaust fans 98A-C and 112, whereas an adjustment to maintain the negative pressure within the booth interior generally requires a relatively small or "micro" adjustment.

Additionally, as described above, adjustment of the blowers 62A-C and 78, and/or exhaust fans 98A-C and 112, to maintain negative pressure within the booth 12 is accomplished dynamically, i.e., the air velocity sensors 68A-C and 88 in feed ducts 64A-C, 80 and 84, respectively, and sensors 106A-C and 120 in exhaust ducts 94A-C, 108 and 109, respectively, operate to sense the air flow rate throughout the system operation, including the "ramp up-ramp down" period, and send signals to the second closed loop in the controller 74 to obtain the appropriate "micro" or small magnitude adjustment. In other words, it is preferred that the negative pressure is maintained even when the blower and exhaust fan of a coating zone are ramping up or ramping down to adjust the air flow as a function of the volume of air displaced by the vehicle. A controller 74 such as an Allen Bradley PLC5 or other suitable commercially available, closed loop controllers, P.C.s or microprocessors can be employed in the system herein.

Additional adjustments of the blowers 62A-c and/or exhaust fans 98A-C may be required to maintain the negative pressure with a zone of the booth. For example, the introduction of air introduced into a coating zone by the spray guns 51 and/or 53 may be sufficient enough to affect the negative pressure within a zone and/or affect the air flow therein. Therefore, in some instances it may be necessary to adjust the speed of a blower 62A-C and/or the associated exhaust fan 98A-C of a zone in conjunction with the operation of the spray guns. For example, the exhaust fan speed could be increased in conjunction with the operation of several spray guns of a zone to maintain the negative pressure of the zone and/or booth.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, in the embodiment of this invention illustrated in the Figs., a single air house 76 and air feed blower 78 is employed to provide conditioned air to a feed duct 80 connected to the plenum 82 of first transition zone 57 and to the feed duct 84 connected to the plenum 86 of second transition zone 59. It is contemplated, however, that a separate air house and air feed blower could be employed for each knock-down or transition zone 57 and 59 in order to individually control the flow of conditioned air into such zones 57 and 59, if desired. This same type of arrangement is employed on the exhaust side of transition zones 57, 59 wherein the exhaust ducts 108, 109 for the respective zones 57, 59 are connected to a single exhaust fan 112. It is also contemplated that each duct 108, 109 could be provided with a separate exhaust fan 112, if desired.

In addition, the operation of controller 74 is described as being sequenced with the speed of the conveyor which transports the vehicle body 34 through the booth 12. It is contemplated that instead of programming the controller 74 in this fashion, position sensors could be provided within the interior 30 of booth 12 to sense the position of a vehicle body 34 within any of the zones 46, 48 or 50 therein and send appropriate signals to drive the controller 74 in accordance with the sensed vehicle position.

Further, while the cross sectional area of the cut-in zone 46 in the illustrated embodiment is greater than that of either the side coating zone 48 or overhead coating zone 50, it is contemplated that the booth interior 30 could be formed with the same cross sectional area along its entire length.

Therefore, it is intended that the invention not be limited to the particular embodiment disclosed as the best mode contemplated for carrying out this invention, but that the invention will include all embodiments falling within the scope of the appended claims.

We claim:

1. Apparatus for applying powder coating material onto objects, comprising:
    a spray booth having a top, bottom, sides and ends defining an interior which provides a controlled area in which to apply powder material onto objects moving therethrough, said interior of said spray booth being formed with a first coating zone, a second coating zone and a transition zone between said first and second coating zones;
    powder collection means located at the bottom of said spray booth for collecting oversprayed powder from said interior of said spray booth;
    air supply means for introducing a separate volume of air into each of said first coating zone, second coating zone and transition zone to assist in the transmission of oversprayed powder through said bottom of said spray booth and into said powder collection means;
    air exhaust means for withdrawing a separate volume of filtered air from said powder collection means in the area of each of said first coating zone, said second coating zone and said transition zone;
    control means connected to said air supply means and connected to said air exhaust means for individually controlling the flow rate at which each of said separate volumes of air are introduced into said first coating zone, said second coating zone and transition zone, and for individually controlling the flow rate at which each said separate volumes of filtered air are withdrawn from said first coating zone, said second coating zone and transition zone, so that the velocity of the air within at least one of said coating zones of said spray booth is maintained below a predetermined maximum velocity throughout movement of an object therethrough.

2. Apparatus for applying powder coating material onto vehicle bodies having vertical and horizontal surfaces to be coated, comprising:
    a spray booth defining an interior providing a controlled area for the application of powder material onto vehicle bodies moving therethrough, said interior of said spray booth being formed with a first coating zone in which exterior vertical surfaces of the vehicle body are coated, a second coating zone in which exterior horizontal surfaces of the vehicle body are coated and a transition zone between said first and second coating zones;
    powder collection means located at the bottom of said spray booth for collecting oversprayed powder from said interior of said spray booth;
    first air supply and exhaust means for introducing a supply volume of air into said first coating zone of said spray booth to assist in the transmission of oversprayed powder through the bottom of said spray booth into said powder collection means, and for withdrawing an exhaust volume of filtered air from said powder collection means in the area of said first coating zone;
    second air supply and exhaust means for introducing a supply volume of air into said second coating zone of said spray booth to assist in the transmission of oversprayed powder through the bottom of said spray booth into said powder collection means, and for withdrawing an exhaust volume of filtered air from said powder collection means in the area of said second coating zone;
    third air supply and exhaust means for introducing a supply volume of air into said transition zone of said spray booth to assist in the transmission of oversprayed powder through the bottom of said spray booth into said powder collection means, and for withdrawing an exhaust volume of filtered air from said powder collection means in the area of said transition zone;
    control means connected to said first, second and third air supply and exhaust means for individually controlling the flow rate at which each of said supply volumes of air is introduced into said first coating zone, said second coating zone and said transition zone, respectively, and for individually controlling the flow rate at which each of said exhaust volumes of filtered air is withdrawn from said powder collection means in the areas of said first coating zone, said second coating zone and said transition zone, respectively, whereby the downdraft velocity of the air within each coating zone of said spray booth is maintained below a predetermined maximum velocity throughout movement of the vehicle body through said respective coating zones.

3. The apparatus of claim 2 in which said first air supply and exhaust means comprises:
    a blower connected by a duct to a plenum located at said ceiling of said spray booth and extending substantially along the length of said first coating zone; and
    an exhaust fan connected by a duct to said powder collection means in the area of said first coating zone.

4. The apparatus of claim 2 in which said second air supply and exhaust means comprises:
    a blower connected by a duct to a plenum located at said ceiling of said spray booth and extending substantially along the length of said second coating zone; and
    an exhaust fan connected by a duct to said powder collection means in the area of said second coating zone.

5. The apparatus of claim 2 in which said third air supply and exhaust means comprises:
    a blower connected by a duct to a plenum located at said ceiling of said spray booth and extending substantially along the length of said transition zone; and an exhaust fan connected by a duct to said powder collection means in the area of said transition zone.

6. Apparatus for applying powder material onto vehicle bodies having interior areas, exterior vertical surfaces and exterior horizontal surfaces, comprising:
   a spray booth having a ceiling, floor, opposed side walls and end walls which define an interior providing a controlled area for the application of powder material onto vehicle bodies moving therethrough, said interior of said spray booth being formed with a cut-in zone in which the interior areas of the vehicle body are coated, a side coating zone in which the exterior vertical surfaces of the vehicle body are coated, an overhead coating zone in which the exterior horizontal surfaces of the vehicle are coated, a first transition zone between said cut-in zone and said side coating zone and a second transition zone between said side coating zone and said overhead coating zone;
   powder collection means located beneath said floor of said spray booth for collecting oversprayed powder from said interior of said spray booth;
   first air supply and exhaust means for introducing a supply volume of air into said cut-in coating zone of said spray booth to assist in the transmission of overspray powder through said floor of said spray booth into said powder collection means, and for withdrawing an exhaust volume of filtered air from said powder collection means in the area of said cut-in coating zone;
   second air supply and exhaust means for introducing a supply volume of air into said side coating zone of said spray booth to assist in the transmission of oversprayed powder through said floor of said spray booth into said powder collection means, and for withdrawing an exhaust volume of filtered air from said powder collection means in the area of said side coating zone;
   third air supply and exhaust means for introducing a supply volume of air into said overhead coating zone of said spray booth to assist in the transmission of oversprayed powder through said floor of said spray booth into said powder collection means, and for withdrawing an exhaust volume of filtered air from said powder collection means in the area of said overhead coating zone;
   fourth air supply and exhaust means for introducing a supply volume of air into said transition zone of said spray booth to assist in the transmission of oversprayed powder through said floor of said spray booth into said powder collection means, and for withdrawing an exhaust volume of filtered air from said powder collection means in the area of said transition zones;
   fifth air supply and exhaust means for introducing a supply volume of air into said second transition zone of said spray booth to assist in the transmission of oversprayed powder through said floor of said spray booth into said powder collection means, and for withdrawing an exhaust volume of filtered air from said powder collection means in the area of said second transition zone;
   control means connected to each of said first, second, third, fourth and fifth air supply and exhaust means for individually controlling the flow rate at which each of said supply volumes of air is introduced into respective zones of the spray booth, and for individually controlling the flow rate at which each of said exhaust volumes of air is withdrawn from respective zones of said spray booth, so that the downdraft velocity of air within at least a portion of each of said zones of said spray booth is maintained below a predetermined maximum velocity throughout movement of the vehicle body through a respective zone.

7. The apparatus of claim 6 in which said cut-in zone has a larger cross sectional area than said side coating zone and said overhead coating zone.

8. The apparatus of claim 6 in which said control means is effective to control said first, second and third air supply and exhaust means such that the downdraft air velocity within said overhead coating zone is greater than the air velocity in either of said side coating zone or said cut-in zone.

9. The apparatus of claim 6 in which said control means is effective to control said second and third air exhaust and supply means such that the downdraft air velocity within said side coating zone is less than the air velocity within said overhead coating zone.

10. The apparatus of claim 6 in which each of said first, second and third air supply and exhaust means comprises:
    an air house;
    a blower located within said air house and being connected by a duct to a plenum, said plenum being located at said ceiling of said spray booth and extending along one of said cut-in zone, side coating zone and overhead coating zone;
    an exhaust fan connected by a duct to said powder collection means in the area of one of said cut-in zone, side coating zone and overhead coating zone.

11. The apparatus of claim 6 in which said fourth air supply and exhaust means comprises:
    an air house having a blower located therein;
    a supply duct interconnecting said blower to a plenum located at said ceiling of said spray booth at said first transition zone;
    an exhaust fan;
    an exhaust duct interconnecting said exhaust fan with said powder collection means in the area of said first transition zone.

12. The apparatus of claim 11 in which said fifth air supply and exhaust means comprises:
    a supply duct interconnecting said blower to a plenum located at said ceiling of said spray booth at said second transition zone; and
    an exhaust duct interconnecting said exhaust fan with said powder collection means in the area of said second transition zone.

13. Apparatus for applying powder material onto objects, comprising:
    a spray booth having a top, bottom, sides and ends defining an interior which provides a controlled area in which to apply powder material onto objects moving therethrough, said interior of said spray booth being formed with a first coating zone, a second coating zone and a transition zone between said first and second coating zones;
    powder collection means located at the bottom of said spray booth for collecting oversprayed powder from said interior of said spray booth;
    air supply means for introducing a separate volume of air into each of said first coating zone, second coating zone and transition zone within said interior of said spray booth to assist in the transmission of oversprayed powder through said bottom of said spray booth into said powder collection means;

air exhaust means for withdrawing a separate volume of filtered air from said powder collection means in the area of each of said first coating zone, said second coating zone and said transition zone;

control means connected to said air supply means and connected to said air exhaust means for:
  (i) individually controlling the flow rate at which each of said separate volumes of air is introduced into said first coating zone, said second coating zone and said transition zone;
  (ii) individually controlling the flow rate at which each of said separate volumes of filtered air is withdrawn from said powder collection means in the area of said first coating zone, said second coating zone and said transition zone; and
  (iii) maintaining at least a slightly negative pressure within said interior of said booth.

14. The apparatus of claim 13 in which said air supply means comprises:
  a separate air house associated with each of said first coating zone, said second coating zone and said transition zone, each of said air houses containing a variable speed blower;
  a separate feed duct interconnecting each of said blowers to a separate plenum associated with each of said first coating zone, said second coating zone and said transition zone.

15. The apparatus of claim 14 in which said air exhaust means comprises:
  a separate variable speed exhaust fan associated with each of said first and second coating zones, and with said transition zone;
  a separate feed duct interconnecting each of said exhaust fans to said powder collection means in the area of one of said first and second coating zones and said transition zone.

16. The apparatus of claim 15 in which said control means includes:
  a controller;
  a first air velocity sensor mounted in each of said separate feed ducts which interconnect one of said blowers with one of said first and second coating zones and said transition zone, each of said first air velocity sensors directing a first signal to said controller which corresponds to the air velocity sensed within the respective feed duct;
  a second air velocity sensor mounted in each of said separate exhaust ducts which interconnect one of said exhaust fans with said powder collection means in the area of each of said first and second coating zones and said transition zone, each of said second air velocity sensors directing a second signal to said controller which corresponds to the air velocity sensed within the respective exhaust duct;
  said controller being effective to compare a first signal and a second signal obtained from the respective feed duct and exhaust duct associated with each of said first and second coating zones and said transition zone, and to control the speed of operation of said blower and said fan associated with each of said first and second coating zones and said transition zone, so that more air is withdrawn from said spray booth than enters said spray booth to maintain at least a slightly negative pressure within the interior of said spray booth.

17. A method of applying powder coating material onto an object, comprising:
  moving the object through a first coating zone located in the interior of a powder spray booth within which powder material is applied to at least one portion of the object;
  moving the object from the first coating zone into a second coating zone located within the interior of the spray booth within which powder material is applied to a different portion of the object;
  introducing a supply volume of air into said first coating zone, and simultaneously withdrawing an exhaust volume of air from said first coating zone;
  introducing a volume of air into said second coating zone, and simultaneously withdrawing a volume of air from said second coating zone;
  varying at least one of the flow rates at which said supply volume of air is introduced into said first coating zone and at which said exhaust volume of air is withdrawn from said first coating zone as a function of the volume of air displaced by the object within said first coating zone in the course of movement of the object therethrough, and varying at least one of the flow rates at which said supply volume of air is introduced into said second coating zone and at which said exhaust volume of air is withdrawn from said second coating zone as a function of the volume of air displaced by the object within said second coating zone in the course of movement of the object therethrough, so that the velocity of air within said interior of said spray booth is maintained below a predetermined maximum velocity throughout movement of the object through said spray booth.

18. The method of claim 17 in which said step of varying at least one of the flow rates at which air is introduced into and withdrawn from said first coating zone comprises varying the speed of operation of at least one of an air feed blower which introduces said supply volume of air into said first coating zone and an air exhaust fan which withdraws said exhaust volume of air from said first coating zone.

19. The method of claim 17 in which said step of varying at least one of the flow rates at which air is introduced into and withdrawn from said second coating zone comprises varying the speed of operation of at least one of an air feed blower which introduces said supply volume of air into said second coating zone and an air exhaust fan which withdraws said exhaust volume of air from said second coating zone.

20. The method of claim 17 in which said step of varying at least one of the flow rates at which air is introduced into and withdrawn from said first coating zones comprises adjusting a damper located in a feed duct which transmits said supply volume of air into said first coating zone between an open and closed position, and/or adjusting a damper located in an exhaust duct which withdraws said exhaust volume of air out of said first coating zone between an open and closed position.

21. The method of claim 17 in which said step of varying at least one of the flow rates at which air is introduced into and withdrawn from said second coating zone comprises adjusting a damper located in a feed duct which transmits said supply volume of air into said second coating zone between an open and closed position, and/or adjusting a damper located in an exhaust duct which withdraws said exhaust volume of air out of said second coating zone between an open and closed position.

22. A method of applying powder coating material onto an object, comprising:

moving the object through a first coating zone located in the interior of a powder spray booth within which powder material is applied to at least one portion of the object;

moving the object into a second coating zone located within the interior of the spray booth downstream from the first coating zone within which powder material is applied to a different portion of the object;

introducing a volume of air into said first coating zone, and simultaneously withdrawing a volume of air from said first coating zone;

introducing a volume of air into said second coating zone, and simultaneously withdrawing a volume of air from said second coating zone;

varying at least one of the flow rates at which air is introduced into and withdrawn from said first coating zone as a function of the volume of air displaced by the object within said first coating zone in the course of movement of the object therethrough, and varying at least one of the flow rates at which air is introduced into and withdrawn from said second coating zone as a function of the volume of air displaced by the object within said second coating zone in the course of movement of the object therethrough, so that the downdraft velocity of air within at least one of said first and second coating zones is maintained below a predetermined maximum velocity throughout movement of the object therethrough, and so that at least a slightly negative pressure is maintained within the interior of the powder spray booth.

23. The method of claim 22 in which said step of simultaneously varying at least one of the flow rates at which air is introduced into and withdrawn from said first coating zone comprises:

sensing the velocity of the volume of air introduced into said first coating zone at a location exteriorly of the spray booth to produce a first signal;

sensing the velocity of the volume of air withdrawn from said first coating zone at a location exteriorly of the spray booth to produce a second signal;

comparing said first signal with said second signal and then adjusting the relative magnitude of the flow rates at which air is introduced into and withdrawn from said first coating zone so that at least a slightly negative pressure is maintained within said first coating zone of the powder spray booth.

24. The method of claim 22 in which said step of simultaneously varying at least one of the flow rates at which air is introduced into and withdrawn from said second coating zone comprises:

sensing the velocity of the volume of air introduced into said second coating zone at a location exteriorly of the spray booth to produce a first signal;

sensing the velocity of the volume of air withdrawn from said second coating zone at a location exteriorly of the spray booth to produce a second signal;

comparing said first signal with said second signal and then adjusting the relative magnitude of the flow rates at which air is introduced into and withdrawn from said second coating zone so that at least a slightly negative pressure is maintained within said second coating zone of the powder spray booth.

25. A method of applying powder material onto a vehicle body, comprising:

moving the vehicle body into a first coating zone located within the interior of a spray booth wherein the vertically oriented exterior portions of the vehicle body are coated with powder;

moving the vehicle body into a second coating zone located downstream from the first coating zone wherein the horizontally oriented exterior portions of the vehicle body are coated with powder;

introducing a volume of air into said first coating zone, and simultaneously withdrawing a volume of air from said first coating zone;

introducing a volume of air into said second coating zone, and simultaneously withdrawing a volume of air from said second coating zone;

varying at least one of the flow rates at which air is introduced into said first coating zone and at which air is withdrawn from said first coating zone as a function of the volume of air displaced by the object within said first coating zone in the course of movement of the object therethrough, and varying at least one of the flow rates at which air is introduced into said second coating zone and at which air is withdrawn from said second coating zone as a function of the volume of air displaced by the object within said second coating zone in the course of movement of the object therethrough, so that the downdraft velocity of air within at least one of said first and second coating zones is maintained at a predetermined downdraft velocity throughout movement of the object therethrough.

26. The method of claim 25 in which said step of varying at least one of the flow rates at which air is introduced into and withdrawn from said first coating zone and said second coating zone comprises varying said flow rates so that the air velocity within said first coating zone is less than the air velocity within said second coating zone when a vehicle body is present therein.

27. A method of applying powder material onto a vehicle body, comprising:

moving the vehicle body into a first coating zone located within the interior of a spray booth wherein interior surfaces of the vehicle body are coated with powder;

moving the vehicle body from the first coating zone through a first transition zone wherein oversprayed powder is collected;

moving the vehicle body from the first transition zone into a second coating zone wherein the vertically oriented, exterior surfaces of the vehicle body are coated with powder;

moving the vehicle body from the second coating zone through a second transition zone wherein oversprayed powder is collected;

moving the vehicle body from the second transition zone into a third coating zone wherein the horizontally oriented, exterior surfaces of the vehicle body are coated with powder;

introducing an input volume of air into each of said first, second and third coating zones and into said first and second transition zones wherein each input volume has an independent, input flow rate, and simultaneously withdrawing an exhaust volume of air from each of said first, second and third coating zones and from said first and second transition zones wherein each exhaust volume has an independent, exhaust flow rate;

independently varying said input flow rate at which each of said input volumes of air are introduced into said first, second and third coating zones and into said first and second transition zones, and/or independently varying said output flow rate at which each of said output volumes of air are withdrawn from said first, second and third coating zones and from said first and second transition zones, so that the downdraft velocity of air within each coating zone is maintained blow respective predetermined maximum velocities throughout movement of the vehicle body through the spray booth.

28. A method of applying powder coating material to a vehicle, comprising the steps of:

(a) introducing a first supply volume of air at a first flow rate into a first coating zone located in the interior of a powder spray booth wherein powder coating material is applied to at least one portion of the vehicle, and simultaneously withdrawing a first exhaust volume of air from the first coating zone at a second air flow rate;

(b) introducing a second supply volume of air at a third flow rate into a second coating zone located in the interior of the powder spray booth wherein powder coating material is applied to another portion of the vehicle, and simultaneously withdrawing a second exhaust volume of air from the second coating zone at a fourth air flow rate;

(c) generating for a particular vehicle type a first air flow rate profile which is dependent on the vehicle position within the first coating zone to maintain a constant downdraft velocity as the vehicle moves through the first coating zone;

(d) generating for the particular vehicle type a second air flow rate profile which is dependent on the vehicle position within the second coating zone to maintain a constant downdraft velocity as the vehicle moves through the second coating zone;

(e) moving the vehicle through the first coating zone while applying said powder coating material and varying the first, second, or both flow rates in accordance with said first air flow rate profile generated for the first coating zone; and (f) moving the vehicle through the second coating zone while applying said powder coating material and varying the third, fourth or both flow rates in accordance with said second air flow rate profile generated for the second coating zone.

29. The method of claim 28 wherein steps (e) and (f) are repeated for a plurality of vehicles of the same vehicle type.

30. The method of claim 29 in which the step of varying the first, second or both flow rates at which air is introduced into and withdrawn from said first coating zone comprises varying the speed of operation of at least one of an air feed blower which introduces said supply volume of air into said first coating zone and an air exhaust fan which withdraws said exhaust volume of air from said first coating zone; and in which the step of varying the third, fourth or both the flow rates at which air is introduced into and withdrawn from said second coating zone comprises varying the speed of operation of at least one of an air feed blower which introduces said supply volume of air into said second coating zone and an air exhaust fan which withdraws said exhaust volume of air from said second coating zone.

31. The method of claim 30 further comprising the steps of varying at least one flow rate of each coating zone to maintain a slightly negative pressure within the interior of the powder spray booth.

32. The method of claim 28 further comprising the step of introducing a third supply volume of air and simultaneously withdrawing a third exhaust volume of air from a transition zone disposed between the coating zones to prevent the migration of overspray coating material from one coating zone to another.

33. Apparatus for applying powder coating material onto objects, comprising:

a spray booth having a top, bottom, sides and ends defining an interior which provides a controlled area in which to apply powder material onto objects moving therethrough;

powder collection means located at the bottom of said spray booth for collecting oversprayed powder from said interior of said spray booth;

air supply means for introducing a volume of air into the spray booth to assist in the transmission of oversprayed powder through said bottom of said spray booth and into said powder collection means for filtering of the powder to produce clean air;

air exhaust means for withdrawing a volume of clean air from said powder collection means at said bottom of said spray booth;

control means connected to said air supply means and connected to said air exhaust means for controlling the flow rate at which said volume of air is introduced into the spray booth and for controlling the flow rate at which said volume of filtered air is withdrawn from the spray booth, as a function of the volume of air displaced by the objects in the course of passage through said interior of said spray booth, so that the velocity of the air within said spray booth is maintained below a predetermined maximum velocity throughout movement of an object therethrough.

* * * * *

UNITED STATES PATENT AND TRADEMARK OFFICE
CERTIFICATE OF CORRECTION

PATENT NO. : 5,095,811
DATED : March 17, 1992
INVENTOR(S) : Jeffrey R. Shutic et al.

It is certified that error appears in the above-identified patent and that said Letters Patent is hereby corrected as shown below:

In column 12, line 34, "cut-in zone 66" should be --cut-in zone 46--.

In column 13, line 18, "respec-tively," should be --respectively,".

In column 13, line 49, "con-nected" should be --connected--.

Signed and Sealed this

Twelfth Day of July, 1994

Attest:

BRUCE LEHMAN

Attesting Officer  Commissioner of Patents and Trademarks